United States Patent

[11] 3,614,485

[72] Inventors Armond D. Cosman; Albert L. Snider, both of Austin, Tex.

[21] Appl. No. 847,687
[22] Filed Aug. 5, 1969
[45] Patented Oct. 19, 1971
[73] Assignee Austron, Inc. Austin, Tex.

[54] ELECTROMECHANICAL REED SYSTEM
8 Claims, 3 Drawing Figs.

[52] U.S. Cl. .......... 310/8.2, 310/8.5, 310/25, 333/72
[51] Int. Cl. .......... H01v 7/00
[50] Field of Search .......... 310/8.2, 8.3, 8.5, 25; 333/72

[56] References Cited

UNITED STATES PATENTS

| | | | |
|---|---|---|---|
| 3,461,326 | 8/1969 | Holt | 310/8.2 |
| 3,024,429 | 3/1962 | Cavalieri et al. | 333/72 |
| 3,354,413 | 11/1967 | Ko | 333/72 |
| 3,290,609 | 12/1966 | Shreve | 330/1 |
| 2,271,200 | 1/1942 | Mason | 310/8.2 |
| 1,930,536 | 10/1933 | Piersol | 310/8.2 |
| 3,128,397 | 4/1964 | Shinada | 310/9.5 |

*Primary Examiner*—Milton O. Hirshfield
*Assistant Examiner*—B. A. Reynolds
*Attorneys*—Kanz, Glaser & Harwood and Kenneth R. Glaser

ABSTRACT: Disclosed are frequency sensitive electromechanical systems employing mechanically coupled vibratory elements, as reeds or tines, having laterally spaced strain sensitive elements, as piezoelectric wafers, affixed to corresponding major faces of the vibratory elements. Select ones of the piezoelectric wafers are electrically interconnected to eliminate erroneous output signals due to external shocks to the system from any direction. Input and/or output means are coupled to selected interconnected wafers for respectively applying and picking off input and output signals to and from the vibratory elements having a frequency in the vicinity of the mechanical resonant frequency of the system.

INVENTORS
ARMOND D. COSMAN
ALBERT L. SNIDER

Kanz, Glaser & Harwood
ATTORNEYS

ELECTROMECHANICAL REED SYSTEM

The invention pertains to frequency sensitive electromechanical systems, more particularly to electromechanical systems employing vibratory reeds or tines as the frequency sensitive elements, and even more particularly to such systems which are substantially insensitive to external shocks.

There is generally known in the art a frequency sensitive electromechanical system which broadly comprises a pair of vibratory elements rigidly supported at respective ends thereof, the free ends capable of vibrating in response to the application thereto of a periodic excitation voltage having a frequency in the vicinity of the natural resonant frequency of the vibratory elements. These vibratory elements may be a pair of elongated strips of elastic material, conventionally referred to as reeds, joined by a block of material having a high modulus of elasticity; or in the more specialized instance, they may be the times of a conventional tuning fork. By reason of the fact that the vibration of the vibratory elements are particularly responsive in the vicinity of or at, the resonant frequency, of the vibratory elements, and since the resonant frequency of these elements may be controlled by use of the proper material and dimensions of the vibrating elements, the system may be employed for many purposes including electronic filters, oscillators or frequency transducers, for example.

In one class of these systems, the energizing signal is ordinarily supplied to, and/or the output signal obtained from, the system by way of electrodes suitably joined to chips or wafers of piezoelectric material secured to the respective reeds or tines. The piezoelectric material exhibits the property of changing dimension when an electrical charge is induced on the faces thereof, or alternatively having an electric charge induced on the faces when the piezoelectric material is forced to change in dimension (is strained). Consequently, when an input voltage of specific frequency is applied to select piezoelectric elements, the resultant dimension change of these elements cause the coupled vibratory elements to oscillate, the resultant oscillation producing an output voltage from leads coupled to other ones of the piezoelectric members.

While this system briefly described offers considerable advantages including its extreme sensitivity and capability of operating at very low frequencies, one of the disadvantages heretofore associated with these type systems is the susceptibility to shocks imparted to the system from external sources. These external shocks or jars result is unwanted vibrations of the tines, thereby producing extraneous and erroneous signals at the output of the system. Various attempts have been made to minimize or eliminate these shock effects, most of these attempts utilizing techniques directed to the reduction or elimination of unwanted signals caused by forces applied to the system only in a plane parallel to the plane of principal oscillation of the tines. One such technique has been described in U.S. Pat. No. 2,875,353. Erroneous output signals caused by shock forces being applied normal to, or at an angle other than parallel to, the plane of principal vibration of the tines, however, continue to remain a severe problem.

It is therefore a primary object of the invention to provide an improved electromechanical system of the type including vibratory elements such as reeds or tuning fork tines as the frequency sensitive elements.

It is another object of the invention to provide an improved frequency sensitive element of an electromechanical system which is substantially insensitive to external shocks to that system.

It is an even further object of the invention to provide a novel electrical interconnect arrangement between piezoelectric members secured to the tines of a tuning fork or to other type vibratory members embodied in a frequency sensitive electromechanical system.

In accordance with these and other objects, the present invention is broadly directed to an electromechanical system which comprises a pair of oppositely disposed elongated vibratory members, such as conventional reeds or the tines of a tuning fork, free ends of these vibratory members adapted to vibrate in response to an applied periodic excitation voltage having a frequency in the vicinity of the mechanical resonant frequency of the system. The driving or pickup means for the vibratory members comprise piezoelectric wafers or ships, or other strain sensitive elements, which are secured to respective major faces of the oppositely disposed reeds or tines, at least two of these piezoelectric chips on oppositely disposed reeds located at equal distances, but opposite directions, from the respective central axes of the major faces. The so-disposed wafers are electrically interconnected to provide for the substantial elimination of any output signal from the system as a consequence of external shocks being applied to the reeds or tines. As a result, the output signals from the system are a function only of specifically applied input signals of the desired frequency.

These and other features and advantages of the invention are more specifically described in the following described description taken in conjunction with the accompanying drawings, wherein.

Figure 1:
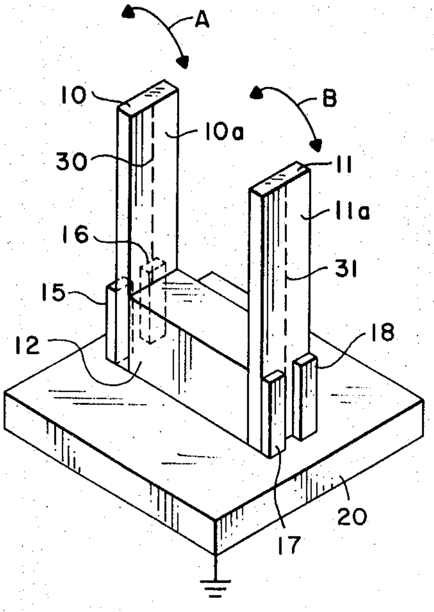
FIG. 1 is a perspective view of the electromechanical system of the invention illustrating the split-chip or wafer features.

Referring now to the drawings, the principle of the invention is best described with respect to the initial FIG. 1. In accordance with this embodiment, a pair of elongated reed elements 10 and 11 are mechanically coupled at their one ends to a block 12 in a manner that enables the respective free ends 10*a* and 11*a* thereof to vibrate, when excited, principally in the direction of arrows A and B. The entire assembly is secured to base or support block 20.

Affixed to one of the major faces, specifically the outside faces of the elements 10 and 11, are a plurality of laterally disposed wafers or chips 15–18 formed of piezoelectric material. As subsequently described, these piezoelectric chips or wafers are the driving and pickup elements for the vibrating reed members 10 and 11. In the embodiment illustrated in FIG. 1, these wafers are arranged in pairs (15 and 16) and (17 and 18), flush with the front and rear edges, respectively, of the reeds 10 and 11. Critical to the advantageous operation of the invention, subsequently described, is the location of the elements 15–18. Thus, wafers 16 and 17 are disposed equal distances, though in opposite directions, from the respective axes 30 and 31. Similarly, wafers 15 and 18 are disposed equal distances, though in opposite directions, from respective axes 30 and 31. In the illustrated embodiment, wafers 15–18 are flush with the front and rear edges of the reeds 10 and 11.

Reed elements 10 and 11 are of the type generally known in the art and may be formed of any suitable material having a high modulus of elasticity, the length, thickness, and stiffness thereof being selected to give the desired resonant frequency. Reeds 10 and 11 may be of various shapes and sizes, but preferably have substantially identical dimensions and resonant frequencies. The mechanically coupling block 12 is also formed of a material having a high modulus of elasticity, generally the same as the reeds 10 and 11.

The wafers or chips 15–18 are formed of a suitable piezoelectric material. For example PZT ceramic, which exhibits the property of changing dimension when a charge is induced on the two opposite faces thereof and, conversely, causing an electric charge to appear on the two faces when a dimension change is induced in response to an externally applied stress. To preserve the symmetry of the system, it is desirable that each of the chips 15–18 be of the same dimensions and material characteristics and, at least as to the wafers that are electrically interconnected in the manner subsequently described, have their exposed faces polarized identically so that like charges appear on these faces.

The provision of the laterally spaced symmetrically located, piezoelectric wafers affixed to the outside faces of the reeds enables advantageous interconnecting arrangements between the reeds not previously known or suggested before. One such arrangement which constitutes a preferred embodiment of the invention is now described in conjunction with FIG. 2. A tuning fork 40 is illustrated having a pair of tines 41 and 42 adapted to vibrate in a known manner upon application of an external force or periodic excitation having a frequency in the vicinity of the mechanical resonant frequency of the tuning fork tines. In essence, the tuning fork 40 is a special case of a pair of mechanically coupled reed elements, the tines 41 and 42 corresponding to the reeds 10 and 11 shown in FIG. 1, and the body portion 44 corresponding to the block 12. Since the entire fork 40 is ordinarily formed of the same material, the tines 41 and 42, 25 well as the body portion 44, thus have the identical modulus of elasticity. Secured to the outer faces of the tines 41 and 42 are the piezoelectric wafers 15–18 in the same manner as previously described with respect to FIG. 1. The entire assembly is then mounted to the supporting block 50.

In accordance with a principal feature of the invention, the piezoelectric elements 15 and 16 associated with the one tine 41 are respectively electrically interconnected with the piezoelectric elements 16 and 17 associated with the other tine 42. Specifically, lead 46 interconnects chips 15 and 18, and lead 47 interconnects chips 16 and 17. In actual operation of the system, a driving signal at the input terminal having a frequency equal to the mechanical resonant frequency of the tuning fork 40, including tines 41 and 42 and elements 15–18, is supplied to the interconnected elements 15 and 18. Due to the resulting dimension change in these elements 15 and 18, the tines 42 and 42 consequently vibrate 180 ° out of phase with one another. The resulting output signal produced by the dimension change of chips 16 and 17 is then coupled by way of lead 47 interconnecting chips 16 and 17 to the output terminal.

Figures 2, 3:
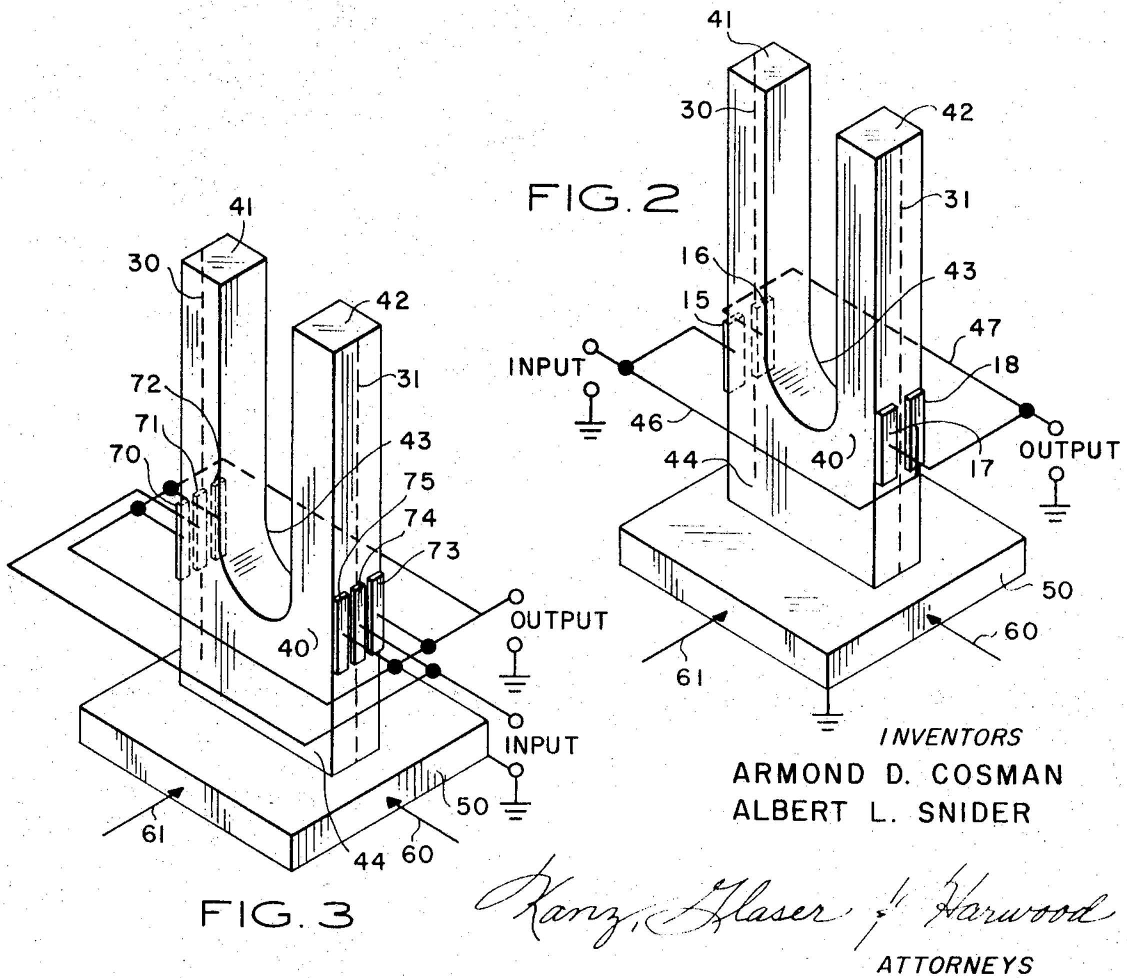
FIG. 2 is a perspective view of one embodiment of a tuning fork frequency sensitive element illustrating the novel interconnection arrangement thereof.
FIG. 3 is a perspective view of another embodiment of the invention.

The system illustrated in FIG. 2 may be employed in many different applications, for example as a filter tuned to the resonant frequency of the tuning fork. Thus, assume it is desired to filter out all frequency components of an input signal except 500 c.p.s. The tuning fork 40 and associated chips 15–18 would be so constructed and chosen to have a mechanical resonant frequency of approximately 500 c.p.s. Unless and until the input signal includes a 500 c.p.s. signal, there will be substantially no output signal at the output terminals. Other applications of the system can be as an oscillator or as a frequency transducer, for example.

Among the difficulties associated with prior art configurations of tuning fork electromechanical systems is the vulnerability to external shocks to the system. Thus when such a shock is present, the tines of the tuning fork will consequently vibrate producing a signal at the output independent of the presence of the desired input signal. The unique advantage associated with the sets of paired chips and interconnect arrangement illustrated in FIG. 2 is the substantial elimination of these unwanted and extraneous output signals as a consequence of external shocks applied to the system from any direction, and particularly to the base 50.

Assume a shock force 60 is applied in the manner illustrated in FIG. 2 in the direction of principal vibration of the tines 41 and 42. This impact then forces the tines 41 and 42 to vibrate in phase, initially placing the element 17 (and 18) under tension, and simultaneously placing the element 16 (and 15) under compression. Since these chips are electrically interconnected, however, the resulting electrical signals cancel one another, thus eliminating a false signal at the output. In like manner, assume a shock force 61 is applied to the base 61 in a plane normal to the plane of principal vibration of the tines 41 and 42. This force initially places the element 17 (and 15) under tension and the chip 16 (and 18) under compression; again, due to the cross-connection of the two piezoelectric elements 16 and 17, the resulting output signals will cancel one another, eliminating a false signal at the output. The resulting cancellation depends, of course, upon the feature that the interconnected chips 16 and 17 have their exposed faces of identical polarity, that the chips 16 and 17 be of substantially identical dimension and electrical characteristic, and that each chip be laterally spaced from its respective axes 30 and 31 for the identical distance. The lateral spacing of the piezoelectric wafers from the axes 30 and 31 also enables each of the wafers 15–18 to have a damping effect on any oscillations of the tines 41 and 42 except the desired oscillation mode (180° out of phase).

Various modifications of the system shown in FIG. 2 may be made without departing from the teachings herein. For example, the piezoelectric elements may be disposed on the inside major faces of the tines 41 and 42 adjacent the heel portion 43. In addition, chips or wafers 16 and 17 may be connected to the input terminal of the system and thus serve as the driving members thereof, in which case chips 15 and 18 would be connected to the output terminal. It is also to be noted that the wafers 15–18 may be formed of any other material whose electrical characteristics may be altered when strained, for example silicon semiconductor material which resistivity changes in response to oscillation of the tines.

Referring now to FIG. 3 there is illustrated another embodiment of the invention. Accordingly, third piezoelectric elements 71 and 74 are respectively placed on the outside faces of the tines 41 and 42 centrally disposed along the axes 30 and 31 intermediate the laterally disposed chips 70 and 72, 73 and 75, respectively. The centrally disposed wafers 71 and 74 may then be interconnected and coupled to the input terminal, for example, while wafers 70, 72, 73 and 75 are all interconnected and coupled to the output terminal, for example. As before, it is important that each of the interconnected piezoelectric elements should be of the same dimension and electrical characteristics, as well as polarity. The laterally disposed interconnected wafers 70, 72, 73 and 75 thus eliminate any extraneous unwanted output signals produced by shock excitation of the tines 41 and 42. Furthermore, the addition of the centrally disposed piezoelectric elements 71 and 74, and their connection to one another and to the input terminal eliminates the torsional effects on the tines 41 and 42 that result when the input signal is applied solely to the offset or laterally disposed wafers, as depicted on FIG. 2. The same advantageous results occur, of course, when the interconnected wafers 70, 72, 73 and 75 are coupled to the driving signal and the output secured from the intermediate chips 71 and 74. It is to be noted that, if desired, the central wafers 71 and 74 may be eliminated, and the tines be excited by alternate means known in the art, for example electromagnetically, the interconnected wafers 70, 72, 73 and 75 still providing the desired cancellation of any output signals caused by shock excitation.

As pointed out in the previous description, the lateral displacement along the major faces (inside or outside) of each of the interconnected piezoelectric wafers is critical to the present invention. Thus, the interconnected wafers is critical to the present invention. Thus, the interconnected wafers 16, 17; and 15 and 18 must be equidistant from their respective central axes 30 and 31. In addition, the central axes of the wafers 71 and 74 must respectively coincide with the axes 30 and 31, as illustrated in FIG. 3.

Various changes or modifications to the above described embodiments, as well as alternative embodiments, may become obvious to one ordinarily skilled in the art without departing from the spirit and scope of the invention as defined by the appended claims.

What is claimed is:

1. A frequency sensitive electromechanical system comprising:

a. a pair of reed members disposed in parallel and opposed relationship with one another; said reed members each having two major faces thereof, and having respective free ends adapted to vibrate by application thereto of a periodic excitation having a frequency in the vicinity of the natural resonant frequency of said reed members, and b. means for applying said periodic excitation to each of said reed members, c. said means including two sets of piezoelectric wafers respectively secured to major faces of each of said reed members, each of the two sets comprising at least two piezoelectric wafers laterally disposed from one another along, and on opposite sides of the elongated central axis of, the major face.

2. The system as described in claim 1 wherein each of the said two laterally disposed piezoelectric wafers are disposed equidistant from, but on opposite sides of the central elongated major axis of the associated reed member and the piezoelectric wafers secured to the major face of one reed member are respectively electrically cross-connected with the piezoelectric wafers secured to the major face of the other reed member.

3. The system as described in claim 2 including means coupled to one cross-connected pair of piezoelectric wafers for providing an input signal having the frequency in the vicinity of the natural resonant frequency of said reed members, and output means coupled to the other cross-connected pair of piezoelectric wafers.

4. In an electromechanical system of the type including a tuning fork as a frequency sensitive element, the improvement comprising:

a. two sets of piezoelectric wafers, each set being secured to a major face of respective tines of said tuning form, each of said two sets having at least two wafers laterally disposed along said major face, b. one of the said at least two piezoelectric wafers of each set being disposed on one side of and spaced a given distance from respective major elongated axes of each of said tines, the other of said at least two piezoelectric wafers of each set being disposed on the opposite side of an spaced the same said given distance from axes, and c. means respectively electrically cross-connecting each of the wafers of one tine disposed on the said one side to wafers of the other tine disposed on the said opposite side of the axes.

5. The improvement described in claim 4 wherein means are coupled to one cross-connected pair of piezoelectric wafers for providing an input signal to said tuning fork, said signal having a frequency in the vicinity of the natural resonant frequency of said tuning fork, and output means coupled to the other cross-connected pair of piezoelectric wafers.

6. The improvement described in claim 4 wherein each of said two sets include third wafers respectively secured to the said major face of the respective tines, each said third wafer being intermediate the said at least two wafers and having their central axes aligned on the said major elongated axes, wherein all of said at least two wafers of both tines being electrically interconnected, and including separate means for electrically interconnecting said third wafers together.

7. A frequency sensitive electromechanical system comprising:

a. a pair of reed members disposed in parallel and opposed relationship with one another; said reed members each having two major faces thereof, and having respective free ends adapted to vibrate by application thereto of a periodic excitation having a frequency in the vicinity of the natural resonant frequency of said reed members, b. a first set of strain sensitive wafers secured to a major face of one of said reed members, a second set of strain sensitive wafers secured to a major face of the other of said reed members, c. each of the first and second set comprising at least two physically separate wafers having the major portion of their structures laterally disposed from, and on opposite sides of, the elongated central axis of the said major face of the corresponding reed member, and d. means for respectively electrically cross-connecting the wafers of the first set on one side of the corresponding elongated central axis to the wafers of the second set on the opposite side of the corresponding elongated central axis.

8. The system as defined in claim 7, wherein said physically separate wafers are of piezoelectric material, and are entirely laterally disposed from the said elongated central axis.